United States Patent
Hirata

(10) Patent No.: US 10,142,247 B2
(45) Date of Patent: Nov. 27, 2018

(54) COMMUNICATION DEVICE, COMMUNICATION SYSTEM, COMMUNICATION METHOD, AND STORAGE MEDIUM STORING PROGRAM TRANSFERRING DATA USING A PLURALITY OF LINES

(71) Applicant: NEC Corporation, Tokyo (JP)

(72) Inventor: Ikuo Hirata, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 98 days.

(21) Appl. No.: 15/309,520

(22) PCT Filed: May 7, 2015

(86) PCT No.: PCT/JP2015/002320
§ 371 (c)(1),
(2) Date: Nov. 8, 2016

(87) PCT Pub. No.: WO2015/170475
PCT Pub. Date: Nov. 12, 2015

(65) Prior Publication Data
US 2017/0155593 A1    Jun. 1, 2017

(30) Foreign Application Priority Data
May 8, 2014    (JP) ................... 2014-096762

(51) Int. Cl.
*H04L 12/841*    (2013.01)
*H04L 12/26*    (2006.01)
(Continued)

(52) U.S. Cl.
CPC .......... *H04L 47/28* (2013.01); *H04L 43/0894* (2013.01); *H04L 45/125* (2013.01);
(Continued)

(58) Field of Classification Search
CPC ..... H04L 43/0894; H04L 47/25; H04L 47/28; H04L 47/30; H04L 47/36; H04L 45/125; H04L 45/245
See application file for complete search history.

(56) References Cited

U.S. PATENT DOCUMENTS

| | | | |
|---|---|---|---|
| 6,718,393 | B1 | 4/2004 | Aditya |
| 6,813,284 | B2 | 11/2004 | Vayanos et al. |

(Continued)

FOREIGN PATENT DOCUMENTS

| | | |
|---|---|---|
| JP | 2008-187725 A | 8/2008 |
| JP | 2010-171562 A | 8/2010 |

(Continued)

OTHER PUBLICATIONS

International Search Report for PCT/JP2015/002320 dated Jul. 21, 2015 [PCT/ISA/210].

(Continued)

*Primary Examiner* — Mewale A Ambaye
(74) *Attorney, Agent, or Firm* — Sughrue Mion, PLLC

(57) ABSTRACT

[Problem] To provide a communication device that can suppress imbalances in the amount of data transmitted by each communication line in cases where data is transferred using a plurality of communication lines. [Solution] A splitting unit (81) splits a frame that has been input. A distributing unit (82) distributes the split frame in accordance with the output band of each of a plurality of lines. A transmission unit (83) transmits the distributed frame. The distributing unit (82) distributes the frame to a line having the largest remaining output weight, which indicates the ratio of the remaining amount of data that can be output per predetermined period by each line to the amount of data that can be output in a unit time which is set as the output band for each line. The transmission unit (83) transmits a dummy (Continued)

frame equivalent to the remaining amount of data upon the lapse of the predetermined period.

6 Claims, 12 Drawing Sheets

(51) Int. Cl.
| | |
|---|---|
| H04L 12/825 | (2013.01) |
| H04L 12/805 | (2013.01) |
| H04L 12/729 | (2013.01) |
| H04L 12/709 | (2013.01) |
| H04L 12/835 | (2013.01) |

(52) U.S. Cl.
CPC ............ *H04L 45/245* (2013.01); *H04L 47/25* (2013.01); *H04L 47/30* (2013.01); *H04L 47/36* (2013.01)

(56) References Cited

U.S. PATENT DOCUMENTS

| | | |
|---|---|---|
| 7,151,749 B2 | 12/2006 | Vega-Garcia et al. |
| 2005/0135235 A1 | 6/2005 | Maruyama et al. |
| 2010/0182920 A1 | 7/2010 | Matsuoka |
| 2011/0110248 A1 | 5/2011 | Koitabashi et al. |
| 2015/0181459 A1* | 6/2015 | Zhu .................. H04W 28/0289 370/236 |

FOREIGN PATENT DOCUMENTS

| | | |
|---|---|---|
| JP | 2011-103614 A | 5/2011 |
| RU | 2003125268 A | 2/2005 |
| WO | 2004/051955 A1 | 6/2004 |
| WO | 2009/073312 A2 | 6/2009 |

OTHER PUBLICATIONS

Written Opinion for PCT/JP2015/002320 dated Jul. 21, 2015 [PCT/ISA/237].

Communication dated Dec. 1, 2017 issued by the European Patent Office in counterpart application No. 15789544.2.

Kim et al., "Splitting downlink multimedia traffic over WiMAX and WiFi heterogeneous links based on airtime-balance", Wireless Communications and Mobile Computing, vol. 12, No. 7, Jul. 26, 2010, pp. 598-614, XP 055427896 (17 pages total).

Communication dated Dec. 18, 2017, from the Russian Federal Service for Intellectual Property in counterpart Application No. 2016147933/08.

* cited by examiner

Fig. 11
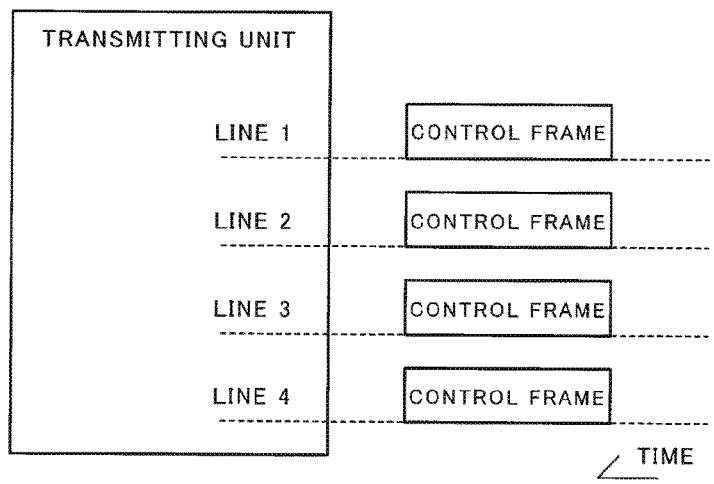
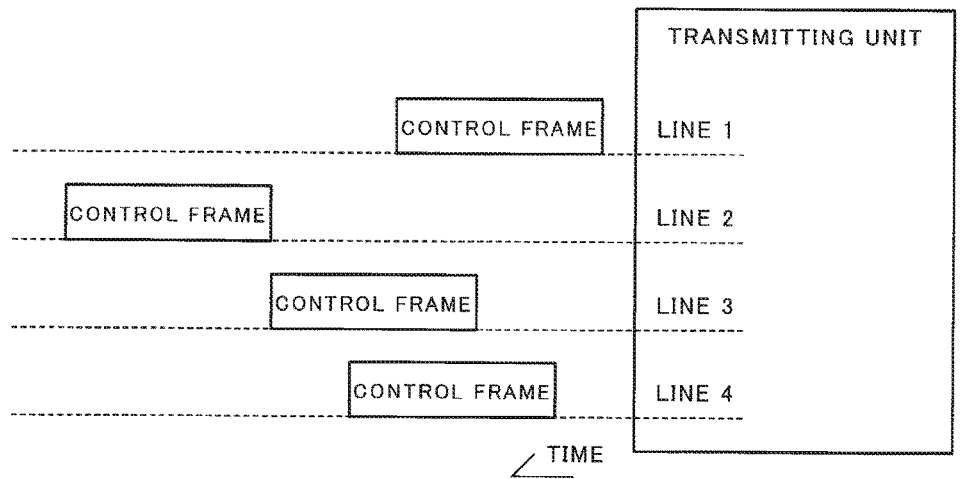

COMMUNICATION DEVICE, COMMUNICATION SYSTEM, COMMUNICATION METHOD, AND STORAGE MEDIUM STORING PROGRAM TRANSFERRING DATA USING A PLURALITY OF LINES

CROSS REFERENCE TO RELATED APPLICATIONS

This application is a National Stage of International Application No. PCT/JP2015/002320 filed May 7, 2015, claiming priority based on Japanese Patent Application No. 2014-096762 filed May 8, 2014, the contents of all of which are incorporated herein by reference in their entirety.

TECHNICAL FIELD

The present invention relates to a communication device, a communication system, a communication method, and a storage medium storing a program for communication that are used for transferring data by aggregating a plurality of communication lines.

BACKGROUND ART

One known technology for increasing a communication bandwidth using a plurality of lines is link aggregation, which is standardized in IEEE (The Institute of Electrical and Electronics Engineers, Inc.) 802.3ad. According to the link aggregation, frames are distributed to a plurality of lines based on MAC (Media Access Control) addresses, IP (Internet Protocol) addresses, or the like.

Besides, PTL 1 describes a method for transmitting data packets in parallel using a plurality of wireless channels or the like, and retransmitting them in case of failure in normal transmission. According to the method described in PTL 1, data frames accumulated in a transmission buffer are used to generate a plurality of data packets, each of which needs an identical transmission time, in units of packets that can be transmitted in parallel, and the data packets are transmitted consecutively in units of packets that can be transmitted in parallel. Then, if a plurality of data packets generated at a time need different transmission times, a dummy bit is added before parallel transmission to a data packet that needs a shorter transmission time so that all the data packets are transmitted in an identical time.

CITATIONS LIST

Patent Literature

[PTL 1] Japanese Unexamined Patent Application Publication No. 2008-187725

SUMMARY OF INVENTION

Technical Problem

The above-described link aggregation may cause an imbalance in consumed bandwidths among lines. For example, in the case where traffic in one line is heavier than the physical bandwidth while traffic in another line is lighter than the physical bandwidth, the above-described method has difficulty in distributing traffic among lines evenly.

Besides, according to the method described in PTL 1, a plurality of data packets are generated so as to have a transmission time identical to one another, and the data is transferred through channels independently of one another. Consequently, an imbalance in the amount of transferred data may be caused among channels depending on the condition of lines.

Thus, an object of the present invention is to provide a communication device, a communication system, a communication method, and a storage medium storing a program for communication that can reduce, in the case where data is transferred by using a plurality of communication lines, an imbalance in the amount of data transmitted through the individual lines.

Solution to Problem

A communication device, according to the present invention, that transfers data using a plurality of lines, comprises:
  splitting means that splits an inputted frame;
  distributing means that distributes split frames based on output bandwidths of the plurality of lines; and
  transmitting means that transmits distributed frames,
  wherein the distributing means distributes a frame to a line that has the largest remaining output weight, which indicates the ratio of the remaining amount of data that can be outputted through the line in every predetermined period to the amount of data that can be outputted per unit time, which is specified for each line as the output bandwidth,
  and wherein the transmitting means transmits a dummy frame equivalent to the remaining amount of data upon lapse of the predetermined period.

A communication system, according to the present invention, comprises a plurality of communication devices, the communication devices each transferring data using a plurality of lines,
  wherein each of the communication devices comprises:
  splitting means that splits an inputted frame;
  distributing means that distributes split frames based on output bandwidths of the plurality of lines; and
  transmitting means that transmits distributed frames,
  wherein the distributing means distributes a frame to a line that has the largest remaining output weight, which indicates the ratio of the remaining amount of data that can be outputted through the line in every predetermined period to the amount of data that can be outputted per unit time, which is specified for each line as the output bandwidth,
  and wherein the transmitting means transmits a dummy frame equivalent to the remaining amount of data upon lapse of the predetermined period.

A communication method, according to the present invention, for transferring data using a plurality of lines, comprises:
  splitting an inputted frame;
  distributing a split frame to a line that has the largest remaining output weight, which indicates the ratio of the remaining amount of data that can be outputted through the line in every predetermined period to the amount of data that can be outputted per unit time, which is specified for each line as an output bandwidth; and
  transmitting a distributed frame and a dummy frame equivalent to the remaining amount of data upon lapse of the predetermined period.

A storage medium storing a program for communication, according to the present invention, to be applied to a computer that transfers data using a plurality of lines, causes the computer to execute:
  a splitting process of splitting an inputted frame;

a distributing process of distributing split frames based on output bandwidths of the plurality of lines; and a transmitting process of transmitting distributed frames, wherein the distributing process is executed to distribute a frame to a line that has the largest remaining output weight, which indicates the ratio of the remaining amount of data that can be outputted through the line in every predetermined period to the amount of data that can be outputted per unit time, which is specified for each line as the output bandwidth, and wherein the transmitting process is executed to transmit a dummy frame equivalent to the remaining amount of data upon lapse of the predetermined period.

Advantageous Effects of Invention

According to the present invention, in the case where data is transferred by using a plurality communication lines, an imbalance in the amount of data transmitted through the individual lines is restrained.

BRIEF DESCRIPTION OF DRAWINGS

FIG. 11 is an explanatory diagram illustrating an example method of measuring a delay time.

DESCRIPTION OF EMBODIMENTS

Exemplary embodiments of the present invention will be described below with reference to the drawings.

Figure 1:
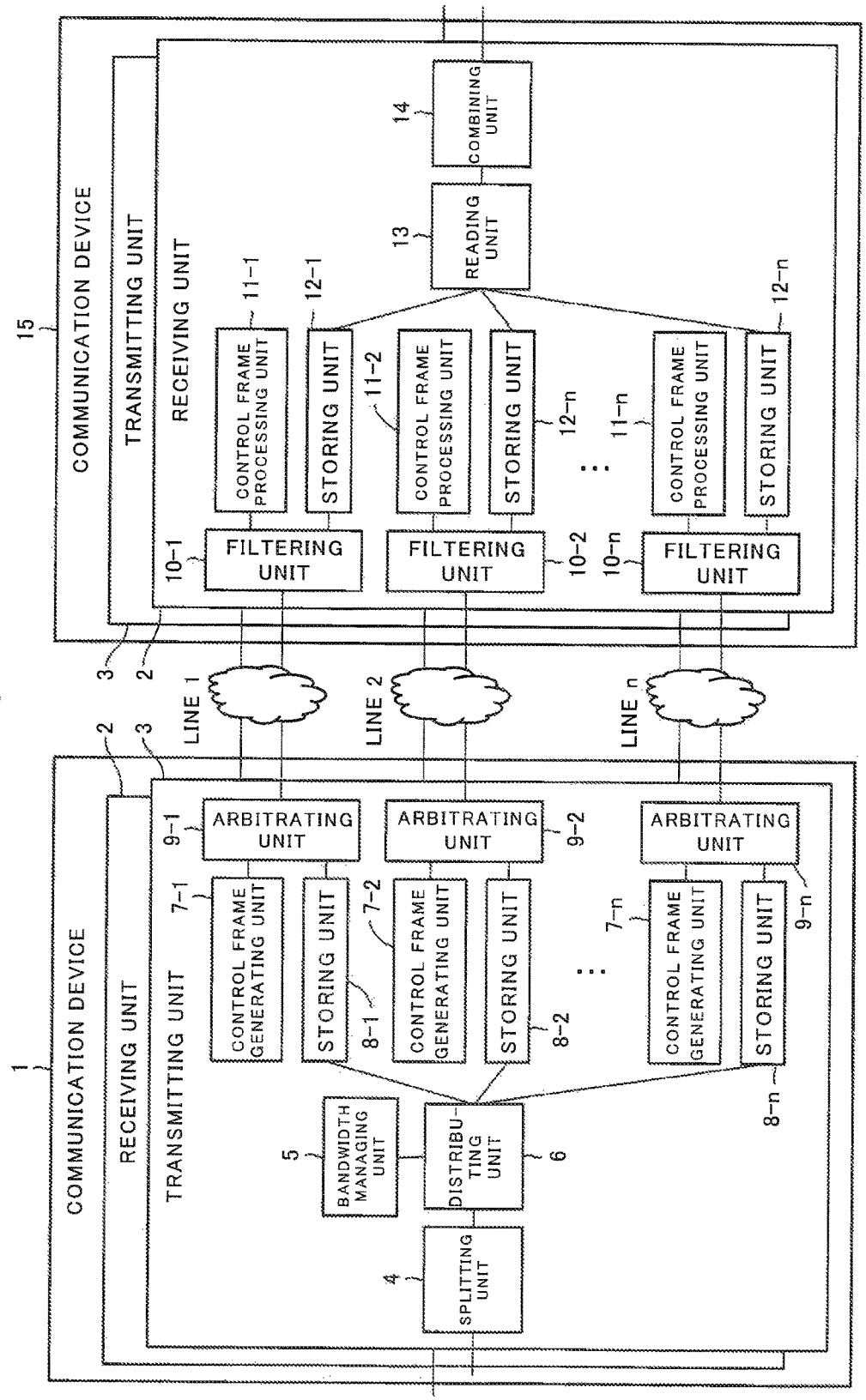
FIG. 1 is a block diagram illustrating an exemplary embodiment of a communication system according to the present invention.

FIG. 1 is a block diagram illustrating an exemplary embodiment of a communication system according to the present invention. The communication system of the present exemplary embodiment includes two communication devices: a communication device 1 and a communication device 15. The communication devices 1 and 15 have identical functions and include a receiving unit 2 and a transmitting unit 3. Note that other than the receiving and transmitting units 2 and 3, the communication devices 1 and 15 may respectively have functions different between the devices.

The communication devices 1 and 15 are connected to each other via a plurality of lines: Line 1, Line 2, . . . , and Line n. The communication devices 1 and 15, constituting a pair, communicate with each other. Note that the communication devices 1 and 15 may be connected to each other directly or via any other device. Note that irrespective of whether they are connected via any other device, frames from the communication device 1 are addressed to the communication device 15. Further, in the present exemplary embodiment, it is assumed that no frame from a device other than the communication device 1 is inputted to the communication device 15.

The transmitting unit 3 includes a splitting unit 4, a bandwidth managing unit 5, a distributing unit 6, control frame generating units 7-1 to 7-n, storing units 8-1 to 8-n, and arbitrating units 9-1 to 9-n. In the descriptions about functions below, the control frame generating units, the storing units, and the arbitrating units are respectively denoted as the control frame generating unit 7, the storing unit 8, and the arbitrating unit 9. The control frame generating unit 7, the storing unit 8, and the arbitrating unit 9 are disposed for every connected line (port).

The splitting unit 4 splits an inputted frame and inputs resultant frames to the distributing unit 6. The splitting unit 4 may use any method of splitting a frame, and thus the splitting unit 4 may use a well-known method to split a frame.

The bandwidth managing unit 5 manages output bandwidths of the individual lines. The distributing unit 6 distributes split frames into the storing unit 8 based on output bandwidths of the individual lines. Note that the details of an output bandwidth managed by the bandwidth managing unit 5 and how the distributing unit 6 distributes post-split frames are described later.

The control frame generating unit 7 generates a control frame to be transmitted to another communication device. In addition, the control frame generating unit 7 generates a dummy frame to be transmitted if the amount of data frames to be transmitted is smaller relative to the output bandwidth of a line managed by the bandwidth managing unit 5. Note that the details of the control frame and the dummy frame are described later.

The storing unit 8 temporarily holds a frame that has been inputted from the distributing unit 6.

The arbitrating unit 9 sequentially transmits, via the connected line, the frames that have been inputted to the storing unit 8.

The splitting unit 4, the bandwidth managing unit 5, the distributing unit 6, the control frame generating unit 7, and the arbitrating unit 9 are implemented by a central processing unit (CPU) in a computer that runs according to a program (program for communication). For example, the program may be stored in a storage unit (not illustrated) in the communication device 1, and the CPU may read the program to act as the splitting unit 4, the bandwidth managing unit 5, the distributing unit 6, the control frame generating unit 7, and the arbitrating unit 9 according to the program.

Alternatively, each of the splitting unit 4, the bandwidth managing unit 5, the distributing unit 6, the control frame generating unit 7, and the arbitrating unit 9 may be implemented by a dedicated hardware piece. Further, the storing unit 8 may be implemented by, for example, a memory.

Figure 2:
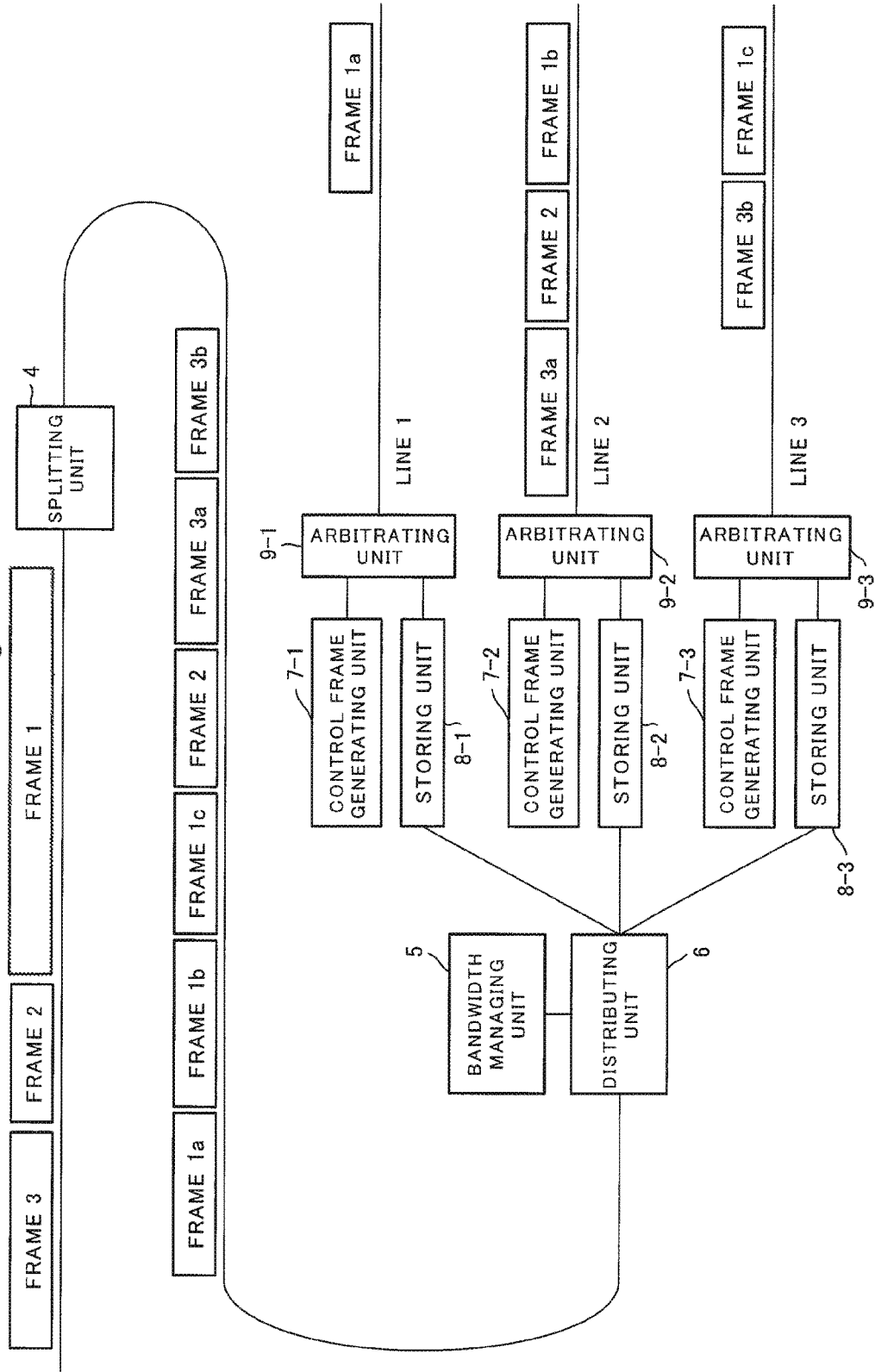
FIG. 2 is an explanatory diagram illustrating an example process of transmitting data frames.

FIG. 2 is an explanatory diagram illustrating an example process of transmitting data frames performed by the transmitting unit 3. When Frames 1, 2, and 3 are inputted to the transmitting unit 3, the splitting unit 4 splits each of the frames, adds a sequence number, a head flag, and an end flag to each of the split frames, and inputs the frames to the distributing unit 6. The head flag identifies whether the data is the head of a frame that has been split, while the end flag identifies whether the data is the end of a frame that has been split.

Here, suppose that the sequence number for Frame 1a is n, then the sequence numbers for Frames 1b, 1c, 2, 3a, and 3b are represented by n+1, n+2, n+3, n+4, and n+5, respectively.

Based on the output bandwidths of the individual lines managed by the bandwidth managing unit 5, the distributing unit 6 transmits frames to the storing units 8 (8-1, 8-2, and 8-3) on the respective lines. The example shown in FIG. 2 assumes that Line 2 has the largest output bandwidth and Line 1 has the smallest output bandwidth among the lines managed by the bandwidth managing unit 5. The storing unit 8, which is disposed for every line, stores received frames. The arbitrating unit 9 (9-1, 9-2, and 9-3) reads any frame stored in the storing unit 8, and transmits it to the line connected thereto.

The receiving unit 2 includes filtering units 10-1 to 10-n, control frame processing units 11-1 to 11-n, storing units 12-1 to 12-n, a reading unit 13, and a combining unit 14. In the descriptions about functions below, the filtering units, the control frame processing units, and the storing units are respectively denoted as the filtering unit 10, the control frame processing unit 11, and the storing unit 12. The filtering unit 10, the control frame processing unit 11, and the storing unit 12 are disposed for every line to be connected (port).

The filtering unit 10 receives a frame transmitted from another device, and inputs the frame to the control frame processing unit 11 and to the storing unit 12.

The control frame processing unit 11 processes a received control frame.

The storing unit 12 temporarily holds a frame that has been inputted from the filtering unit 10.

The reading unit 13 reads frames held by each storing unit 12 and inputs the frames to the combining unit 14.

The combining unit 14 combines frames that have been inputted from the reading unit 13, and transmits the resultant frames to another device.

The filtering unit 10, the control frame processing unit 11, the reading unit 13, and the combining unit 14 are implemented by a CPU in a computer that runs according to a program (program for communication). For example, the program may be stored in a storage unit (not illustrated) in the communication device 1, and the CPU may read the program to act as the filtering unit 10, the control frame processing unit 11, the reading unit 13, and the combining unit 14 according to the program.

Alternatively, each of the filtering unit 10, the control frame processing unit 11, the reading unit 13, and the combining unit 14 may be implemented by a dedicated hardware piece. Further, the storing unit 12 may be implemented by, for example, a memory.

Figure 3:
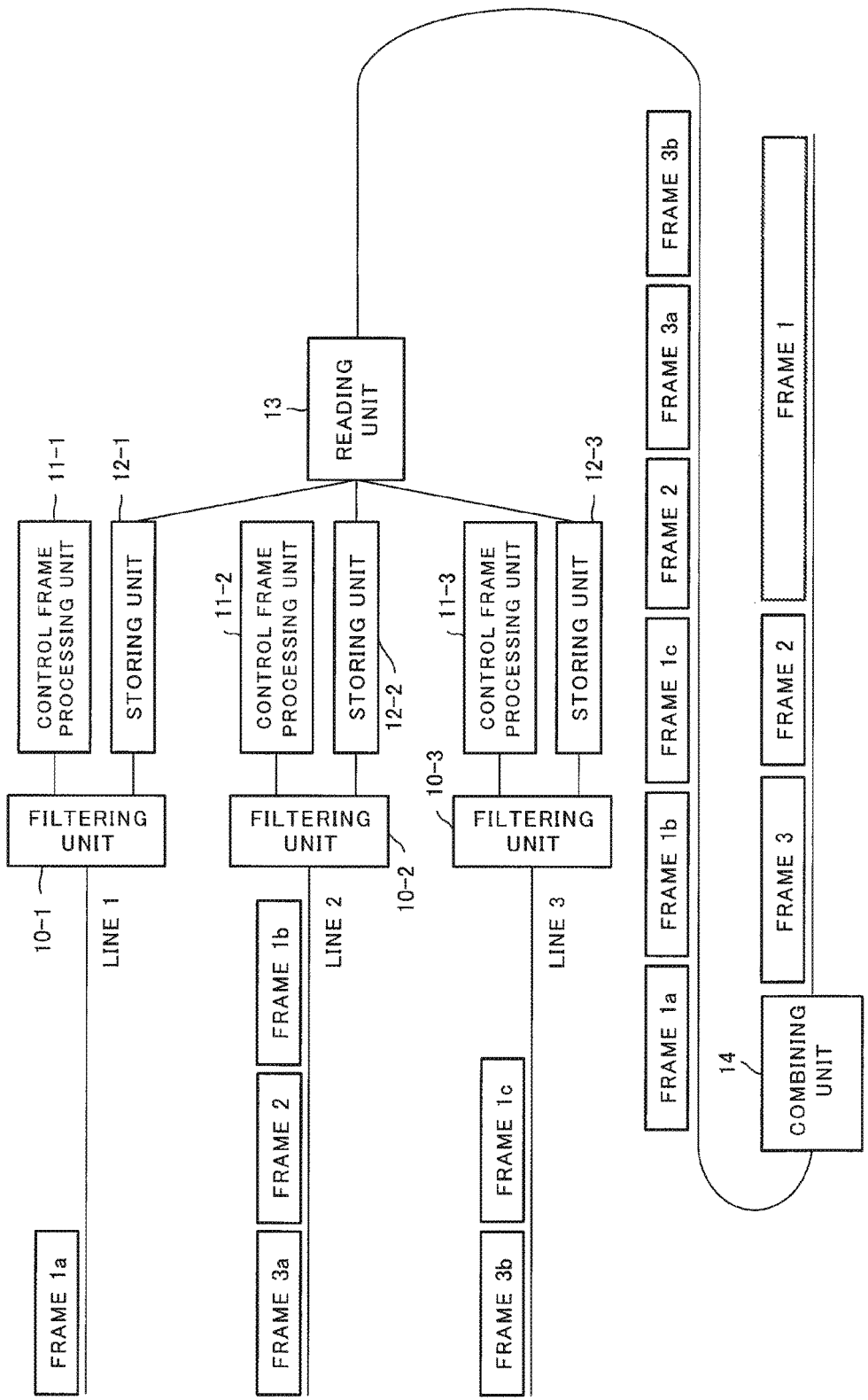
FIG. 3 is an explanatory diagram illustrating an example process of receiving data frames.

FIG. 3 is an explanatory diagram illustrating an example process of receiving data frames performed by the receiving unit 2. Frames 1a, 1b, 1c, 2, 3a, and 3b illustrated in FIG. 3 are the frames that have been transmitted by the individual arbitrating units 9 illustrated in FIG. 2.

The filtering unit 10 (10-1, 10-2, and 10-3) inputs the transmitted data frames to the storing unit 12 (12-1, 12-2, and 12-3). The reading unit 13 reads the data frames stored in the storing unit 12 and inputs them to the combining unit 14 in the order of sequence number, irrespective of the order of arrival.

In the examples illustrated in FIGS. 2 and 3, the reading unit 13 starts with reading Frame 1a, which has the smallest sequence number, and then sequentially reads the following frames, each of which has a sequence number obtained by adding 1 to the previous frame.

The combining unit 14 recognizes a series of frames from the frame having the head flag 1 to the frame having the end flag 1, as a pre-split frame. Then, the combining unit 14 then removes sequence numbers, head flags, and end flags from the split frames, combines these frames together to recover pre-split frames, and transmits the recovered frames.

Next, the following describes details of a control frame. Control frames are used for checking line connections and for dynamically controlling output bandwidths. Specifically, a control frame is generated by the control frame generating unit 7 (7-1, 7-2, . . . , 7-n) in the transmitting unit 3 illustrated in FIG. 1. Then, the arbitrating unit 9 (9-1, 9-2, . . . , 9-n) arbitrates between a data frame and a control frame, and outputs the control frame to the line.

Then, in the receiving unit 2 in the communication device 15, the filtering unit 10 (10-1, 10-2, . . . , 10-n) receives a control frame, and, if the control frame matches the condition for control frames, the filtering unit 10 inputs it to the control frame processing unit 11 (11-1, 11-2, . . . , 11-n). The control frame processing unit 11 analyzes the contents of a control frame, and uses the analyzed contents to control an output bandwidth and to generate a control frame to be transmitted.

Next, the following describes details of a dummy frame. When the amount of data frames to be outputted is smaller relative to a specified output bandwidth, a dummy frame equivalent to the available part of the bandwidth is inserted. A dummy frame is also used for dynamically controlling an output bandwidth, as described later.

Specifically, if the amount of data frames to be outputted is smaller relative to an output bandwidth under management, the bandwidth managing unit 5 notifies this effect to the control frame generating unit 7 (7-1, 7-2, . . . , 7-n) corresponding to the each line. Upon receipt of the notification, the control frame generating unit 7 generates a dummy frame so that outputted frames fit with the output bandwidth managed by the bandwidth managing unit 5, and outputs the dummy frame to the arbitrating unit 9. The arbitrating unit 9 transmits the dummy frame that has undergone output arbitration with data frames.

Further, in the receiving unit 2 in the communication device 15, the filtering unit 10 (10-1, 10-2, . . . , 10-n) receives the dummy frame, and, if the dummy frame matches the condition for dummy frames, the filtering unit 10 inputs it to the control frame processing unit 11 (11-1, 11-2, . . . , 11-n). Then, the control frame processing unit 11 then discards the inputted dummy frame.

Figure 4:
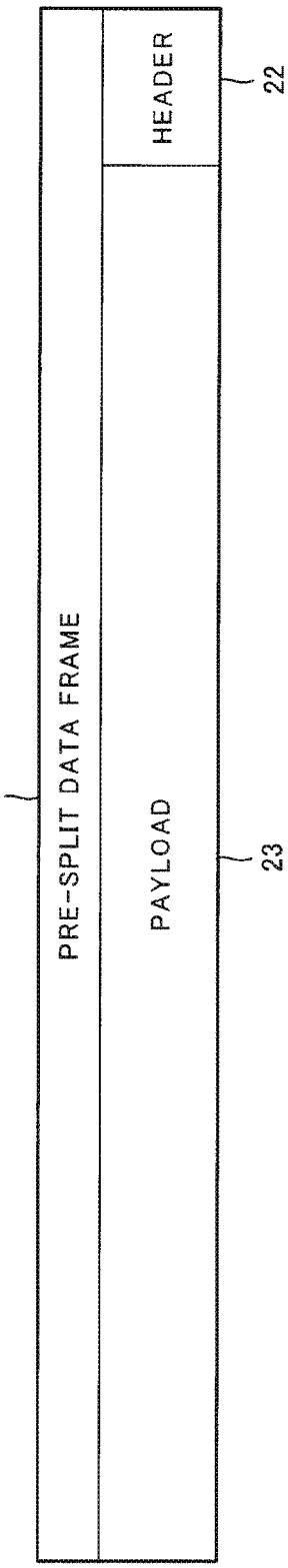
FIG. 4 is an explanatory diagram illustrating an example pre-split data frame.

Next, the following describes details of a frame that is used in the present exemplary embodiment. FIG. 4 is an explanatory diagram illustrating an example data frame before it is split. A pre-split data frame 21 illustrated in FIG. 4 includes a header 22, which is needed for a frame to go through a network, and a payload 23.

Figure 5:
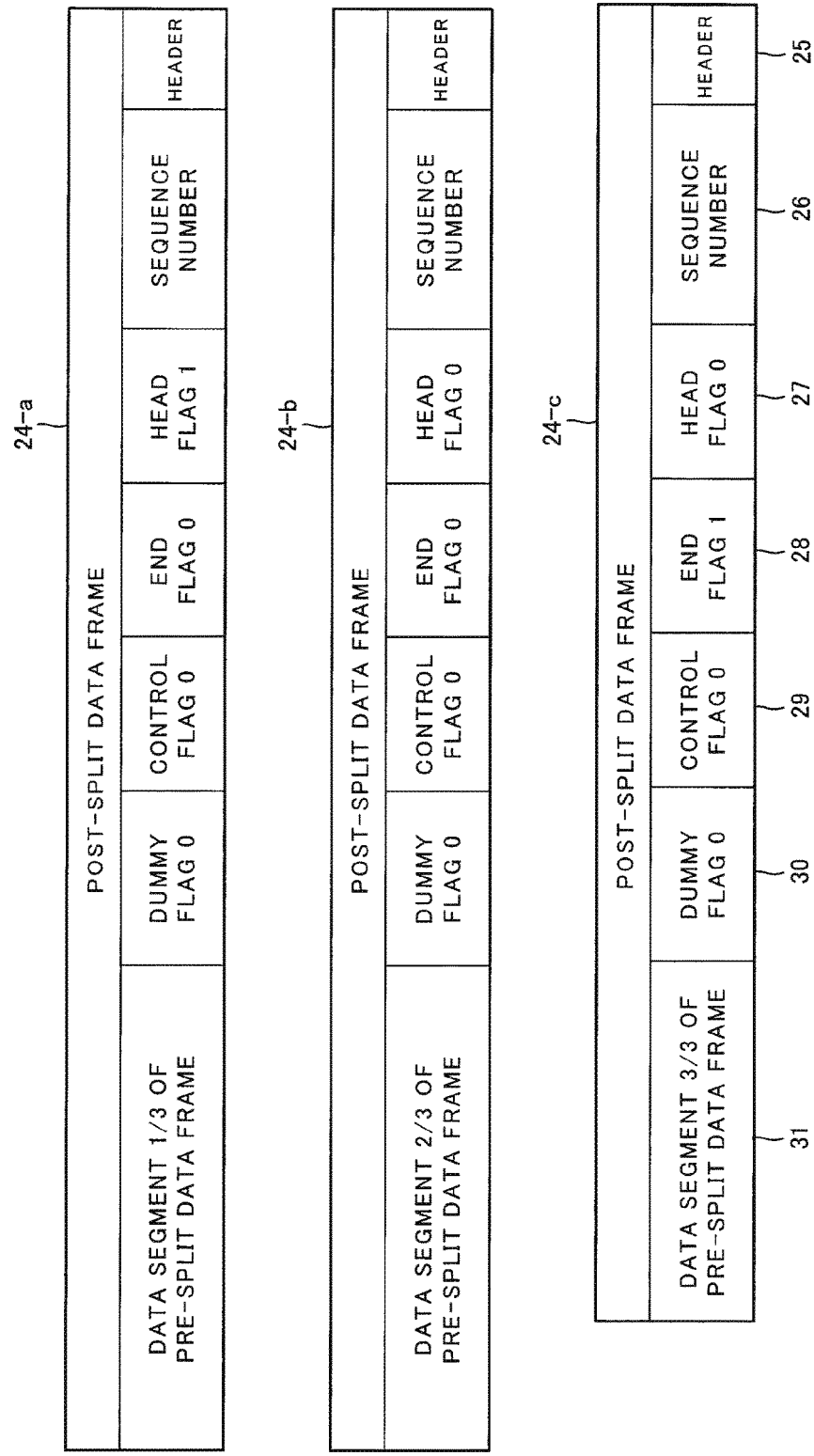
FIG. 5 is an explanatory diagram illustrating example post-split data frames.

FIG. 5 is an explanatory diagram illustrating an example of post-split data frames. Post-split data frames 24-a to 24-c are generated from the pre-split data frame 21 illustrated in FIG. 4. The example in FIG. 5 shows that the pre-split data frame is split into three frames.

As illustrated in FIG. 5 with the post-split data frames 24-a to 24-c, the splitting unit 4 splits a pre-split data frame 21 into data segments 31 of a pre-split data frame. In addition, the splitting unit 4 adds a header 25, a sequence number 26, a head flag 27, an end flag 28, a control flag 29, and a dummy flag 30 to each data segment to generate a post-split data frame.

The header 25, which is needed for a data frame to go through a network, is additionally given aside from the header 22 in a pre-split data frame.

The sequence number 26 is used by the reading unit 13 in the receiving unit 2 for rearranging post-split data frames. The value of the sequence number 26 is determined by adding 1 to the sequence number for the immediately preceding post-split data frame.

The head flag 27 indicates the head of a pre-split data frame. Among the post-split data frames illustrated in FIG. 5, only the post-split data frame 24-a has the head flag 27 set to 1, while the post-split data frames 24-b and 24-c each have the head flag 27 set to 0.

The end flag 28 indicates the end of a pre-split data frame. Among the post-split data frames illustrated in FIG. 5, only the post-split data frame 24-c has the end flag 28 set to 1, while the post-split data frames 24-a and 24-b each have the end flag 28 set to 0.

The head flag 27 and the end flag 28 are used by the combining unit 14 in the receiving unit 2 for assembling frames.

The control flag 29 indicates that the frame is a control frame. Besides, the dummy flag 30 indicates that the frame is a dummy frame. In the post-split data frames illustrated in FIG. 5, the control flags 29 and the dummy flags 30 are set to 0.

Figure 6:
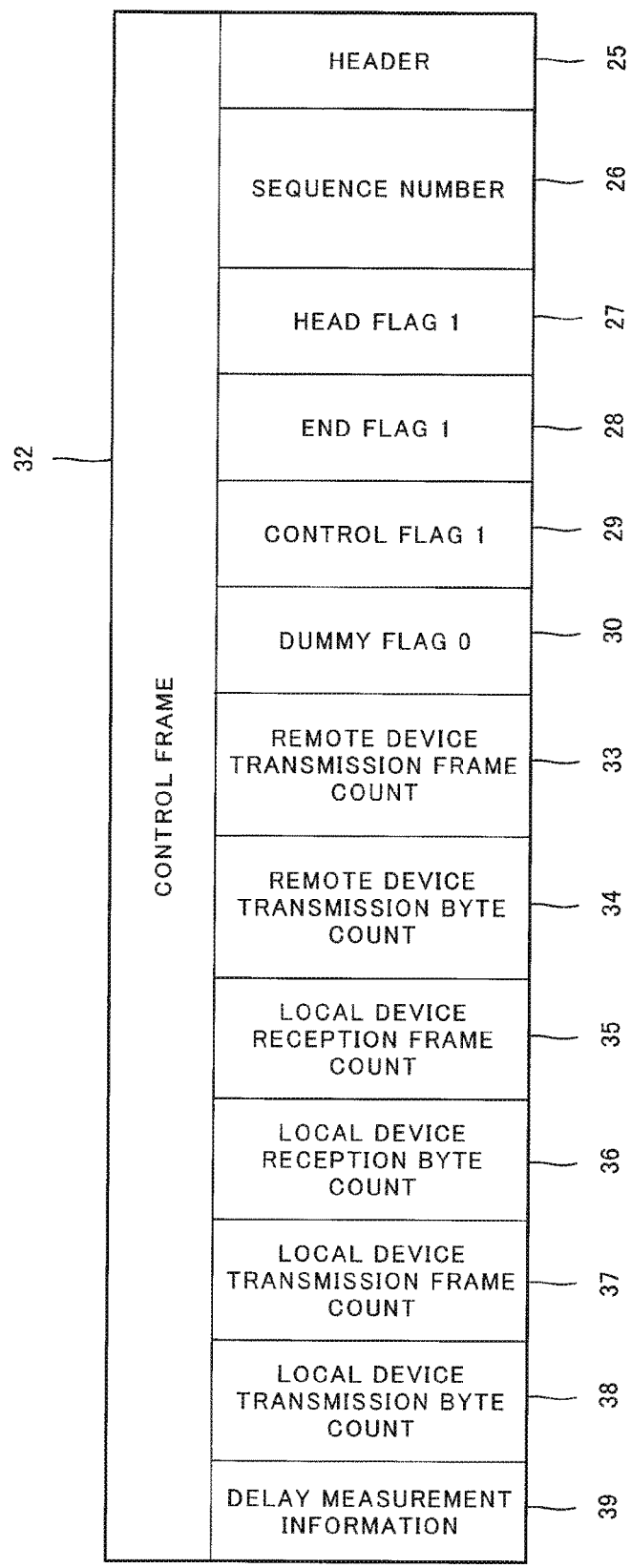
FIG. 6 is an explanatory diagram illustrating an example format of a control frame.

FIG. 6 is an explanatory diagram illustrating an example format of a control frame. As with the post-split data frames illustrated in FIG. 5, a control frame 32 includes a header 25, a sequence number 26, a head flag 27, an end flag 28, a control flag 29, and a dummy flag 30. The value of the sequence number 26 in a control frame is determined by adding 1 to the sequence number for the immediately preceding control frame 32. Further, both the head flag 27 and the end flag 28 are permanently set to 1. Further, the control flag 29, which is a field representing that the frame is a control frame, is set to 1. Further, the dummy flag 30, which is a field representing that the frame is a dummy frame, is set to 0.

If a frame has the control flag 29 set to 1, the filtering unit 10 in the receiving unit 2 determines that the frame is a control frame, and outputs the control frame to the control frame processing unit 11. In other words, the filtering unit 10 makes the determination based on whether the control flag 29 is set to 1, as the condition for control frames.

In addition to the information included in a post-split data frame, the control frame 32 includes, for the purpose of adjusting a bandwidth of a line, a remote device transmission frame count 33, a remote device transmission byte count 34, a local device reception frame count 35, a local device reception byte count 36, a local device transmission frame count 37, a local device transmission byte count 38, and delay measurement information 39.

The remote device transmission frame count 33 indicates the number of frames transmitted from the counterpart communication device. The remote device transmission byte count 34 indicates the number of bytes of frames transmitted from the counterpart communication device. The local device reception frame count 35 indicates the number of frames received from the counterpart communication device. The local device reception byte count 36 indicates the number of bytes of frames received from the counterpart communication device. The local device transmission frame count 37 indicates the number of frames transmitted by the local communication device. The local device transmission byte count 38 indicates the number of bytes of frames transmitted by the local communication device. The delay measurement information 39 indicates a delay time measured when a frame is transmitted. Note that, how the individual fields included in a control frame are used is described later in the description below about the function to adjust an output bandwidth.

Figure 7:
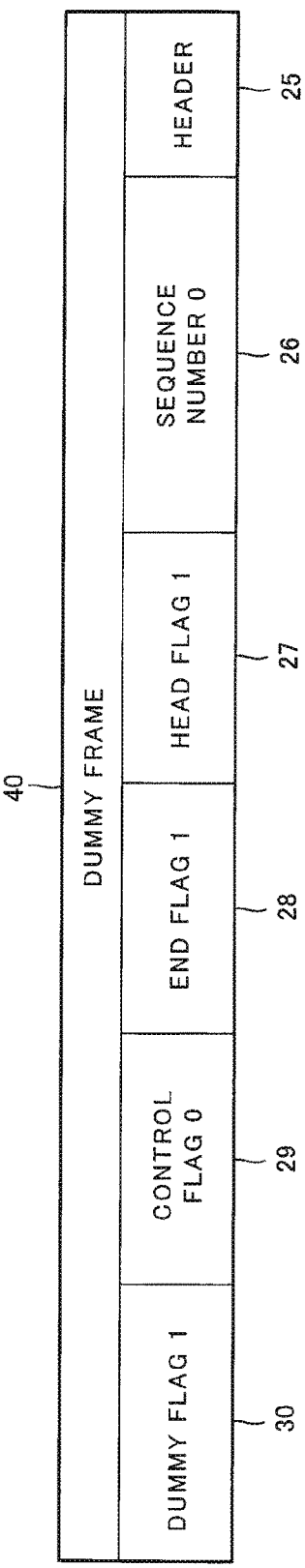
FIG. 7 is an explanatory diagram illustrating an example format of a dummy frame.

FIG. 7 is an explanatory diagram illustrating an example format of a dummy frame. As with the post-split data frames 24 illustrated in FIG. 5 and the control frame 32 illustrated in FIG. 6, a dummy frame 40 includes a header 25, a sequence number 26, a head flag 27, an end flag 28, a control flag 29, and a dummy flag 30.

In a dummy frame, the sequence number 26 is permanently set to 0, and both the head flag 27 and the end flag 28 are permanently set to 1. Further, the control flag 29 is set to 0, and the dummy flag 30 is set to 1.

If a frame has the dummy flag 30 set to 1, the filtering unit 10 in the receiving unit 2 determines that the frame is a dummy frame, and outputs the dummy frame to the control frame processing unit 11. In other words, the filtering unit 10 makes the determination based on whether the dummy flag 30 is set to 1, as the condition for dummy frames.

<Function of Distributing Frames>

Next, the following describes how the distributing unit 6 distributes post-split frames. The bandwidth managing unit 5 manages the amount of data that can be outputted per unit time, which is specified for each line as an output bandwidth, as well as managing the remaining amount of data that can be outputted through the line in every predetermined period. Specifically, the bandwidth managing unit 5 holds the number of bytes available for output per unit time, as the amount of data that can be outputted per unit time, as well as holding each line's number of remaining bytes available for output, as the remaining amount of data that can be outputted in every predetermined period. The unit time is permanently set to a value in any unit.

Every time a post-split data frame is outputted to a line, the distributing unit 6 notifies the bandwidth managing unit 5 of the number of bytes of the outputted post-split data frame. The bandwidth managing unit 5 subtracts the notified number of bytes of the post-split data frame from the number of remaining bytes available for output, which is held by the bandwidth managing unit 5.

Every predetermined period, the bandwidth managing unit 5 sets the amount of data that can be outputted (the number of bytes available for output) to the remaining amount of data that can be outputted (the number of remaining bytes available for output). In other words, every predetermined period, the bandwidth managing unit 5 resets the number of remaining bytes available for output to return to the number of bytes available for output. Specifically, every resetting period, the bandwidth managing unit 5 loads the number of bytes available for output per unit time, as the number of remaining bytes available for output.

The distributing unit 6 calculates a value which represents the ratio of the remaining amount of data that can be outputted to the amount of data that can be outputted. Such calculated value is hereinafter denoted as remaining output weight. The distributing unit 6 may calculate the remaining output weight using Equation 1, which is given below as an example.

Remaining Output Weight=Number of Remaining Bytes Available for Output/Number of Bytes Available for Output per Unit Time (Equation 1)

Then, the distributing unit 6 distributes a frame to the line that has the largest remaining output weight. In other words, a post-split data frame is outputted to the line that has the largest remaining output weight.

Figure 8:
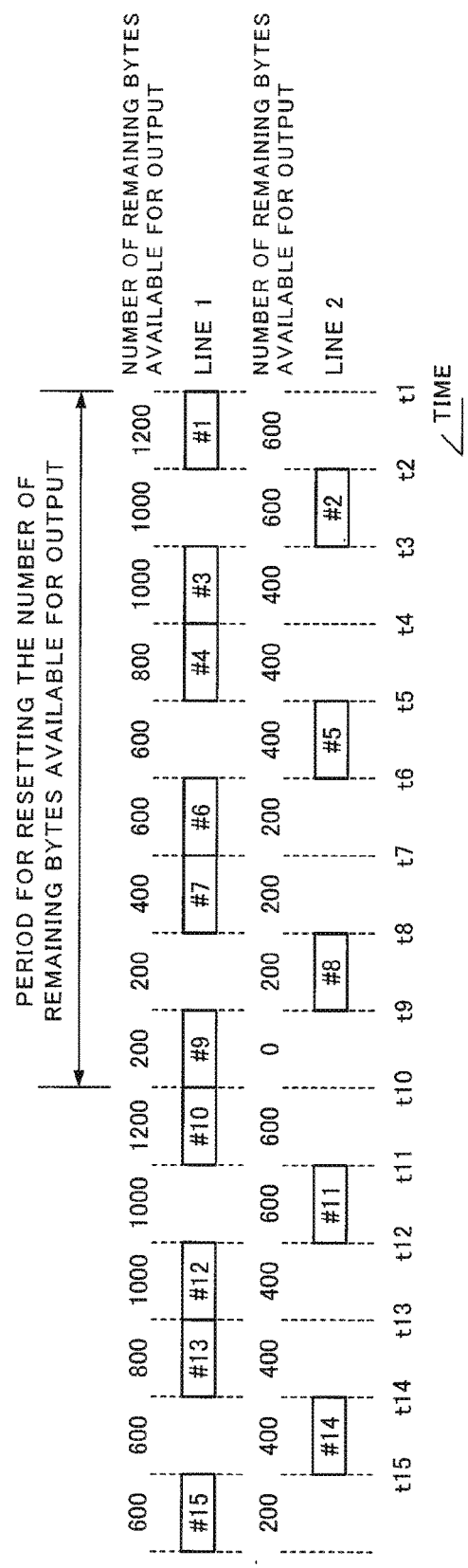
FIG. 8 is an explanatory diagram illustrating an example process of distributing frames.

FIG. 8 is an explanatory diagram illustrating an example process of distributing frames. In the example shown in FIG. 8, frames are distributed by using two lines (Line 1 and Line 2). Here, it is assumed here that Line 1, as illustrated in FIG. 8, has 1,200 as the number of bytes available for output per unit time, while Line 2 has 600 as the number of bytes available for output per unit time. Further, individual frames in FIG. 8 are represented by #, and it is assumed that fifteen frames, #1 to #15, have been transmitted. Note that it is further assumed that the number of bytes of every frame is 200.

As of Time t1, the number of bytes available for output per unit time is set as the number of bytes available for output. That is, the number of bytes available for output to Line 1 is 1,200, while the number of bytes available for output to Line 2 is 600. Upon arrival of Frame #1, the distributing unit 6 calculates the remaining output weight as part of the distributing process. At Time t1, the calculated remaining output weight is an identical value for both Line 1 and Line 2, and thus the distributing unit 6 distributes Frame #1 to Line 1, which is the smaller number of the two. Then, the distributing unit 6 calculates the number of remaining bytes available for output to Line 1 to be 1,000, by subtracting 200.

Next, at Time t2, the number of bytes available for output to Line 1 is now 1,000, while the number of bytes available for output to Line 2 is 600. Thus, the distributing unit 6 calculates the remaining output weight for Line 1 to be about 0.83 and the remaining output weight for Line 2 to be 1.00. Accordingly, the distributing unit 6 distributes Frame #2 to Line 2, which has a larger remaining output weight. Then, the distributing unit 6 calculates the number of remaining bytes available for output to Line 2 to be 400, by subtracting 200.

Likewise, at Time t3, the number of bytes available for output to Line 1 is 1,000, while the number of bytes available for output to Line 2 is now 400. Thus, the distributing unit 6 calculates the remaining output weight for Line 1 to be about 0.83 and the remaining output weight for Line 2 to be about 0.67. Accordingly, the distributing unit 6 distributes Frame #3 to Line 1, which has a larger remaining output weight. Subsequently, these processes are repeated in a similar manner.

Here, it is assumed that the period from Time t1 to Time t10 is used as a period for resetting the number of remaining bytes available for output. At Time t10, the bandwidth managing unit 5 sets the number of bytes available for output per unit time as the number of remaining bytes available for output. That is, the number of remaining bytes available for output to Line 1 is set to 1,200, while the number of remaining bytes available for output to Line 2 is set to 600.

If the number of remaining bytes available for output is not zero at the time of resetting the number of remaining bytes available for output (that is, before the number of bytes available for output is loaded), the bandwidth managing unit 5 notifies the control frame generating unit 7 of the number of remaining bytes available for output. The control frame generating unit 7 generates a dummy frame equivalent to the number of remaining bytes available for output, and outputs the dummy frame to the arbitrating unit 9.

In this way, according to the present exemplary embodiment, the distributing unit 6 compares the remaining output weights between lines to distribute frames. As a result, frames are evenly outputted to Line 1 and Line 2 based on the number of bytes available for output per unit time.

In other words, in the present exemplary embodiment, the distributing unit 6 outputs a post-split data frame to the line that has the largest remaining output weight, rather than outputting it to the line that has the largest number of remaining bytes available for output. Thus, the present exemplary embodiment achieves outputting frames to individual lines evenly, without causing an imbalance in terms of time.

Figure 9:
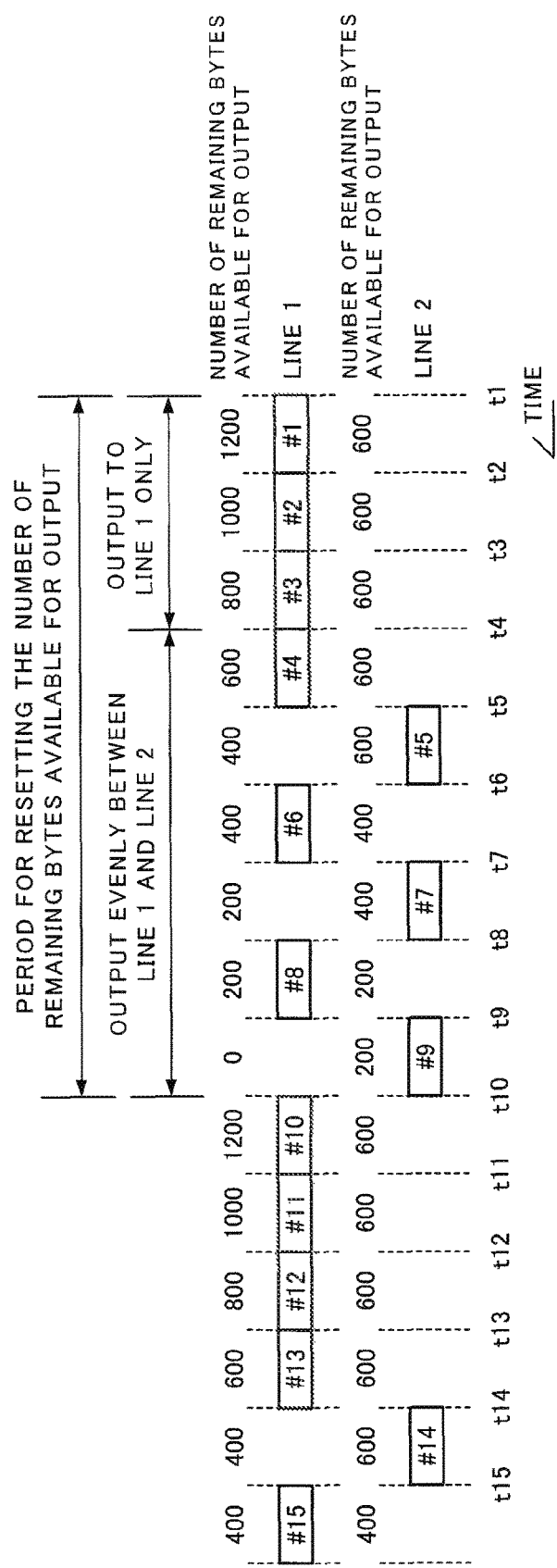
FIG. 9 is an explanatory diagram illustrating an example operation in the case where a frame is outputted to a line that has the largest number of remaining bytes available for output.

Assuming that a frame is outputted to the line that has the largest number of remaining bytes available for output, it would be difficult to output frames evenly as illustrated in FIG. 8. An operation based on this assumption is illustrated in FIG. 9. FIG. 9 is an explanatory diagram illustrating an example operation in the case where a frame is outputted to the line that has the largest number of remaining bytes available for output.

The example in FIG. 9 shows that, throughout the period from Time t1 to Time t4, the number of remaining bytes available for output to Line 1 is equal to or greater than the number of remaining bytes available for output to Line 2. Thus, during this period frames are distributed to Line 1 only, causing an imbalance in frame distribution. It is only after the number of remaining bytes available for output to Line 1 falls below the number of remaining bytes available for output to Line 2, that frames are distributed to Line 1 and Line 2 alternately.

As seen above, if frames are outputted by using the method in which a frame is outputted to the line that has the largest number of remaining bytes available for output, there exist a period when frames are outputted to only one port, as well as a period when frames are outputted to every line evenly. Thus, the method makes it difficult to output frames evenly. In contrast, the present exemplary embodiment solves this problem by outputting a frame to the line that has the largest remaining output weight.

<Function of Adjusting Output Bandwidth>

Figure 10:
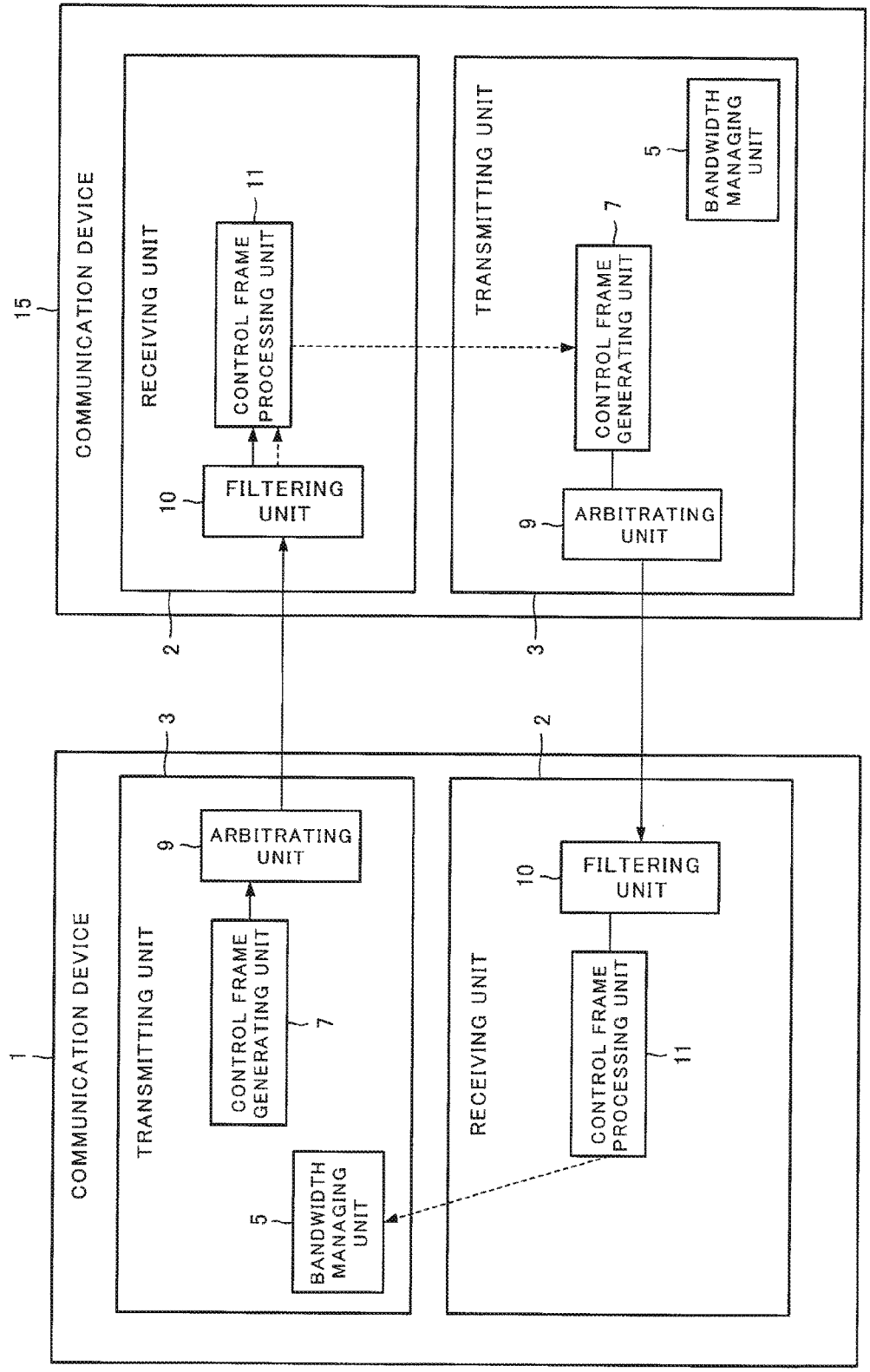
FIG. 10 is an explanatory diagram illustrating an example method of adjusting an output bandwidth.

The following describes a method of adjusting an output bandwidth. FIG. 10 is an explanatory diagram illustrating an example method of adjusting an output bandwidth. In FIG. 10, the solid line arrow illustrated therein represents a flow of frames, and the dotted line arrow represents a flow of control frames. The function of adjusting an output bandwidth includes a function of widening an output bandwidth and a function of narrowing an output bandwidth. The state of performing the function of widening an output bandwidth is hereinafter denoted as the output bandwidth increase mode, while the state of performing the function of narrowing an output bandwidth is hereinafter denoted as the output bandwidth decrease mode. The present exemplary embodiment assumes that the device is initially in the output bandwidth decrease mode, performing the process of narrowing an output bandwidth.

First of all, the following describes the process of narrowing an output bandwidth. In the output bandwidth decrease mode, whether to narrow an output bandwidth is determined by comparing the number of frames transmitted from the communication device 1 with the number of frames received by the counterpart communication device 15. If the number of frames received by the communication device 15 is smaller than the number of frames transmitted by the communication device 1, the bandwidth managing unit 5 makes a setting so as to narrow the output bandwidth of the target line. According to the present exemplary embodiment, a new output bandwidth is calculated by using the number of frames and the number of bytes that have been received from the communication device 15.

In the example illustrated in FIG. 10, the arbitrating unit 9 in the communication unit 1 counts the numbers of frames and bytes of split data frames and dummy frames together that have been transmitted. The counted values are held by, for example, a memory (not illustrated) included in the arbitrating unit 9. Note that the arbitrating unit 9 does not count the numbers of control frames and their bytes.

The control frame generating unit 7 generates a control frame at a predetermined timing, and inputs the control frame to the arbitrating unit 9. The arbitrating unit 9 assigns the number of frames it holds to the local device transmission frame count 37 in the inputted control frame 32, and assigns the number of bytes it holds to the local device transmission byte count 38 in the control frame 32. The arbitrating unit 9 then transmits the control frame 32, to which the number of frames and the number of bytes have been assigned, to the communication device 15. Upon transmission of the control frame 32, the arbitrating unit 9 resets both the number of frames and the number of bytes it holds to zero.

Upon receipt of any split data frame and dummy frame, the filtering unit 10 in the communication device 15 counts the number of received frames and the number of their bytes. The counted values are held by, for example, a memory (not illustrated) included in the filtering unit 10. Note that the filtering unit 10 does not count the numbers of control frames and their bytes.

Upon receipt of a control frame, the filtering unit 10 transmits the received control frame to the control frame processing unit 11. At the same time, the filtering unit 10 notifies the control frame processing unit 11 of the counted numbers of frames and bytes.

The control frame processing unit 11 notifies the control frame generating unit 7 in the local communication device 15 of the local device transmission frame count 37 included in the control frame 32, the frame count 37 being regarded as the remote device transmission frame count. In addition, the control frame processing unit 11 notifies the control frame generating unit 7 in the local communication device 15 of the local device transmission byte count 38 included in the control frame 32, the byte count 38 being regarded as the remote device transmission byte count. Furthermore, the control frame processing unit 11 notifies the control frame generating unit 7 in the local communication device 15 of the frame count notified by the filtering unit 10 in the local communication device 15, the frame count being regarded as the local device reception frame count. In addition, the control frame processing unit 11 notifies the control frame generating unit 7 in the local communication device 15 of the byte count notified by the filtering unit 10 in the local communication device 15, the byte count being regarded as the local device reception byte count.

The control frame generating unit 7 in the communication device 15 assigns, to the remote device transmission frame count 33 in the control frame 32, the remote device transmission frame count that has been notified by the control frame processing unit 11. In addition, the control frame generating unit 7 in the communication device 15 assigns, to the remote device transmission byte count 34 in the control frame 32, the remote device transmission byte count notified by the control frame processing unit 11.

Likewise, the control frame generating unit 7 in the communication device 15 assigns, to the local device reception frame count 35 in the control frame 32, the local device reception frame count notified by the control frame processing unit 11. In addition, the control frame generating unit 7 in the communication device 15 assigns, to the local device reception byte count 36 in the control frame 32, the local device reception byte count notified by the control frame processing unit 11. Then, the arbitrating unit 9 in the communication device 15 transmits the control frame 32 containing the respective information pieces to the communication device 1.

When the filtering unit 10 in the communication device 1 receives the control frame 32, the control frame processing unit 11 compares the remote device transmission frame count 33 with the local device reception frame count 35, both of which are included in the control frame 32. If the remote device transmission frame count 33 is greater than the local device reception frame count 35, the control frame processing unit 11 in the communication device 1 determines that the relevant output bandwidth should be narrowed, calculates a new output area to be specified, and notifies the bandwidth managing unit 5 in the communication device 1 of the calculated output bandwidth. The new output bandwidth may be calculated by using Equation 2, which is given below as an example.

New Output Bandwidth=Local Device Reception Byte Count 36÷Control Frame Transmission Interval   (Equation 2)

Note that the bandwidth managing unit 5 according to the present exemplary embodiment manages a bandwidth based on the number of bytes available for output per unit time. Thus, the bandwidth managing unit 5 may calculate the number of bytes available for output per unit time by using Equation 3, which is given below as an example, and may update the output bandwidth based on the calculated value.

Number of Bytes Available for Output per Unit Time=Unit Time×Output Bandwidth Notified by the Control Frame Processing Unit 11   (Equation 3)

As seen above, in the communication device 1 according to the present exemplary embodiment, the arbitrating unit 9 transmits to the communication device 15 a control frame 32 that contains the amount of transmission data that has been transmitted from each line, and the filtering unit 10 receives the control frame 32 that has been sent from the communication device 15 in response to the transmission of the control frame by the arbitrating unit 9. The received control frame 32 contains the amount of reception data that has been received by the communication device 15. If the amount of reception data is smaller than the amount of transmission data, the bandwidth managing unit 5 makes a setting so as to narrow the output bandwidth of the line through which the control frame has been transmitted. Narrowing an output bandwidth in such a way can further reduce an imbalance in the amount of data among lines.

Next, the following describes the process of widening an output bandwidth. In the output bandwidth increase mode, whether to narrow an output bandwidth is determined depending on whether a frame delay time is caused by a dummy frame that has been temporarily inserted in an additional amount by the communication device 1.

Specifically, before and after the control frame generating unit 7 in the communication device 1 temporarily inserts a dummy frame in an additional amount, the control frame processing unit 11 measures a frame delay time. If there is an increase in a delay time, the control frame processing unit 11 determines that a delay has occurred due to the fact that the communication bandwidth over a network between the communication devices 1 and 15 has exceeded the physical bandwidth, and thus determines that the output bandwidth cannot be widened. In contrast, if there is no increase in a delay time, the control frame processing unit 11 determines that the output bandwidth can be widened.

According to the present exemplary embodiment, it is determined whether an output bandwidth can be widened based on a result of determination about any change in a frame delay time, instead of determining whether frame loss has occurred. The control frame generating unit 7 increases the amount of a dummy frame to the extent that no frame loss is caused, thereby minimizing an influence on data frames.

The bandwidth managing unit 5 in the communication device 1 notifies the control frame generating unit 7 in the communication device 1 of the number of remaining bytes available for output. The control frame generating unit 7 regards the notified number of remaining bytes available for output as the amount of a dummy frame to be inserted, and then generates a dummy frame equivalent to the amount of insertion and outputs it to the arbitrating unit 9 in the communication device 1.

Note that, in the output bandwidth increase mode, the bandwidth managing unit 5 in the communication device 1 adds the increased amount of bandwidth to the number of remaining bytes available for output, and notifies the control frame generating unit 7 in the communication device 1 of the resultant value.

Then, the control frame processing unit 11 in the communication device 1 notifies the bandwidth managing unit 5 in the communication device 1 of whether there is an increase in the amount of delay. If there is no increase in the amount of delay, the bandwidth managing unit 5 in the communication device 1 overwrites the number of bytes available for output per unit time with the increased amount of bandwidth plus the number of bytes available for output per unit time.

In this way, the control frame generating unit 7 increases the amount of data of a transmitted dummy frame, and, if no delay is caused by the increase in the dummy frame, the bandwidth managing unit 5 makes a setting so as to widen the output bandwidth of the line through which the increased dummy frame has been transmitted, based on the increased amount of data of the dummy frame.

The control frame processing unit 11 may measure delay times using either of the two measuring methods illustrated below. However, the method of measuring delay times is not limited to the illustrated two methods.

In the first method, the control frame processing unit 11 measures a delay using time stamps, like the Frame Delay Measurement (ETH-DM) standardized in Y. 1731. According to the Frame Delay Measurement, a delay time is obtained by using a time stamp as of the time when a frame is transmitted and a time stamp as of the time when the frame is received.

In the case of using this method, the control frame generating unit 7 generates a control frame 32 in which the time stamps are added to the delay measurement information 39. Adding the time stamps to the delay measurement information 39 allows measuring a delay. In addition, adding the amount of delay to the delay measurement information 39 allows the amount of delay to be communicated between the communication devices 1 and 15.

According to the second method, the control frame processing unit 11 measures a delay through relative comparison of arrival times of control frames. FIG. 11 is an explanatory diagram illustrating an example method of measuring a delay time.

The example in FIG. 11 shows that control frames are transmitted from four lines simultaneously. The communication device on the receiving side receives the control frames at different timings depending on the bandwidths of the individual lines. Then, the control frame generating unit 7 selects one line whose output bandwidth is to be widened, and temporarily inserts a dummy frame in an additional amount into the line.

If the subsequent arrival time of the control frame represents no increase in the relative amount of delay compared with other lines where additional dummy frames are not inserted, the control frame processing unit 11 determines that the output bandwidth can be widened. The control frame generating unit 7 generates a control frame 32 in which the relative amount of delay is added to the delay measurement information 39. Adding the amount of delay to the delay measurement information 39 allows the amount of delay to be communicated between the communication devices 1 and 15.

The status shift occurs between the output bandwidth increase mode and the output bandwidth decrease mode at the timings described below. In the output bandwidth increase mode, the status shifts to the output bandwidth decrease mode when frame loss occurs. In the output bandwidth decrease mode, the status shifts to the output bandwidth increase mode when the control frame processing unit 11 determines that the line should not be subject to narrowing its output bandwidth (that is, when the remote device transmission frame count 33 is equal to the local device reception frame count 35).

As described above, according to the present exemplary embodiment, the splitting unit 4 splits an inputted frame, the distributing unit 6 distributes the split frames to a plurality of lines based on the output bandwidths of the lines, and the arbitrating units 9 each transmit the distributed frames. During the distribution, the distributing unit 6 distributes a frame to the line that has the largest remaining output weight, which indicates the ratio of the number of remaining bytes available for output to the line to the number of bytes available for output per unit time, which is specified for each line as an output bandwidth. Further, every resetting period, the arbitrating unit 9 transmits a dummy frame equivalent to the remaining amount of data. Thus, in the case where data is transferred by using a plurality communication lines, the present exemplary embodiment can reduce an imbalance in the amount of data transmitted through the individual lines.

Besides, by a method of narrowing an output bandwidth according to the present exemplary embodiment, the arbitrating unit 9 transmits to another device a control frame that includes the amount of transmission data transmitted from each line. Note that the control frame is generated by the control frame generating unit 7. Then, the filtering unit 10 receives a control frame that has been transmitted from the communication device 15 in response to the transmission of the control frame. The control frame includes the amount of reception data received by the communication device 15. If the control frame processing unit 11 determines that the amount of reception data is smaller than the amount of transmission data, the bandwidth managing unit 5 makes a setting so as to narrow the output bandwidth of the line through which the control frame has been transmitted. Narrowing an output bandwidth in such a way can further reduce an imbalance in the amount of data among lines.

Besides, by a method of widening an output bandwidth according to the present exemplary embodiment, the control frame generating unit 7 increases the amount of data of a transmitted dummy frame, and, if no delay is caused by the increased dummy frame, the bandwidth managing unit 5 makes a setting so as to widen the output bandwidth of the line through which the increased dummy frame has been transmitted, based on the increased amount of data of the dummy frame. Making such determination based on delay for a dummy frame can minimize an influence on transmission of data frames. Furthermore, widening an output bandwidth in such a way can achieve efficient data transmission.

As seen above, using the communication devices of the present exemplary embodiment can, while aggregating a plurality of lines, transmit data according to the lines' output bandwidth settings without causing an imbalance among the lines. As a result, communications can be made while traffic is efficiently distributed among lines according to their output bandwidth settings, thereby achieving efficient utilization of the lines.

In addition, if, for example, there is an error in output bandwidth settings for a line, a frame delay or frame loss will occur to cause failure in normal communication because frames cannot be assembled in the order of sequence numbers. The present exemplary embodiment can solve such problem by dynamically adjusting output bandwidth settings for individual lines.

Note that the communication device 1 (communication device 15) described above as the present exemplary embodiment includes a function of efficiently distributing frames, as well as a function of adjusting an output bandwidth. However, the communication device may not necessarily include the function of adjusting an output bandwidth. Alternatively, the communication device may include the function of adjusting an output bandwidth, with either or both of the function of widening an output bandwidth and the function of narrowing an output bandwidth.

Figure 12:
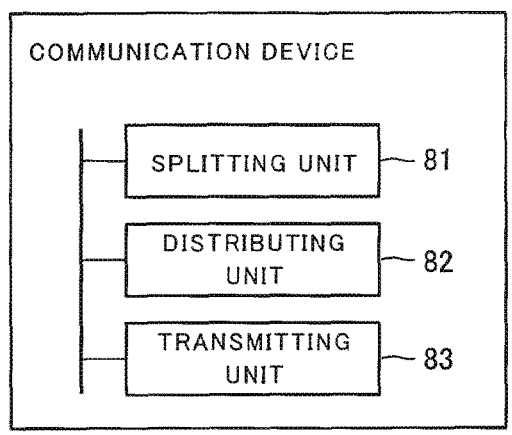
FIG. 12 is a block diagram illustrating an overview of a communication device according to the present invention.

Next, the following presents an overview of the present invention. FIG. 12 is a block diagram illustrating an overview of a communication device according to the present invention. A communication device (for example, the communication device 1 and the communication device 15) according to the present invention transfers data using a plurality of lines, the communication device including: a splitting unit 81 (for example, the splitting unit 4) which splits an inputted frame; a distributing unit 82 (for example, the bandwidth managing unit 5 and the distributing unit 6) which distributes split frames based on output bandwidths of the plurality of lines (for example, based on the individual lines' output bandwidths managed by the bandwidth managing unit 5); and a transmitting unit 83 (for example, the arbitrating unit 9) which transmits the distributed frames.

The distributing unit 82 distributes a frame to the line that has the largest remaining output weight, which indicates the ratio of the remaining amount of data that can be outputted through the line (for example, the number of remaining bytes available for output) in every predetermined period (for example, the resetting period) to the amount of data that can be outputted per unit time, which is specified for each line as an output bandwidth (for example, the number of bytes available for output per unit time). Besides, the transmitting unit 83 transmits a dummy frame (for example, the dummy frame 40) equivalent to the remaining amount of data upon lapse of the predetermined period. Such configuration can reduce, in the case where data is transferred by using a plurality of communication lines, an imbalance in the amount of data transmitted through the individual lines.

Besides, the transmitting unit 83 may transmit to another device a control frame (for example, the control frame 32) that includes the amount of transmission data transmitted from each line (for example, the local device transmission frame count 37 and the local device transmission byte count 38). Besides, the distributing unit 82 (for example, the filtering unit 10) receives a control frame that has been transmitted by another device (for example, the communication device 15) in response to the transmission of the control frame, and, if the amount of reception data received by the other device, as included in the control frame, is smaller than the amount of transmission data (for example, if such determination is made by the control frame processing unit 11), the distributing unit 82 (for example, the bandwidth managing unit 5) may make a setting so as to narrow the output bandwidth of the line through which the control frame has been transmitted.

Specifically, the distributing unit 82 may determine the specified output bandwidth based on the amount of reception data received by the other device relative to the interval between transmissions of a control frame (for example, based on Equation 2 above).

Besides, the transmitting unit 83 (for example, the control frame generating unit 7) may also increase the amount of data of a dummy frame to be transmitted. Then, if no delay is caused by the increased dummy frame, the distributing unit 82 (for example, the bandwidth managing unit 5) may make a setting so as to widen the output bandwidth of the line through which the increased dummy frame has been transmitted, based on the increased amount of data of the dummy frame. Making such determination of an output bandwidth based on delay for a dummy frame can minimize an influence on transmission of data frames. Furthermore, widening an output bandwidth in such a way can achieve efficient data transmission.

Specifically, the transmitting unit 83 may increase the amount of a dummy frame to the extent that no frame loss is caused.

Figure 13:
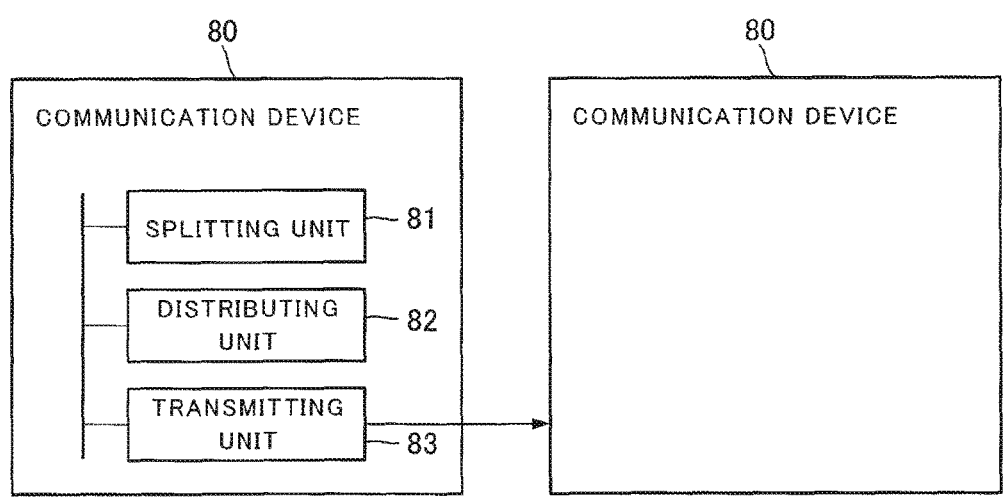
FIG. 13 is a block diagram illustrating an overview of a communication system according to the present invention.

FIG. 13 is a block diagram illustrating an overview of a communication system according to the present invention. The communication system according to the present invention includes a plurality of communication devices 80 that transfer data using a plurality of lines. Note that details of a communication device 80 are the same as the communication device 80 illustrated in FIG. 12.

In the communication system illustrated in FIG. 13, a transmitting unit 83 (for example, the arbitrating unit 9) in a first communication device 80 (for example, the communication device 1) transmits to a second communication device 80 (for example, the communication device 15) a control frame that includes the amount of transmission data (for example, the local device transmission frame count 37 and the local device transmission byte count 38) transmitted from each line. The transmitting unit 83 (for example, the arbitrating unit 9) in the second communication device 80 transmits to the first communication device 80 a control frame that contains the amount of reception data (for example, the remote device transmission frame count 33, the remote device transmission byte count 34, the local device reception frame count 35, and the local device reception byte count 36) received by the local communication device. If the amount of reception data included in the control frame that has been received from the second communication device 80 is smaller than the amount of transmission data, the distributing unit 82 (for example, the control frame processing unit 11 or the bandwidth managing unit 5) in the first communication device 80 makes a setting so as to narrow the output bandwidth of the line through which the control frame has been transmitted.

Such configuration can also reduce, in the case where data is transferred by using a plurality communication lines, an imbalance in the amount of data transmitted through the individual lines.

The whole or part of the exemplary embodiments disclosed above can be described as, but not limited to, the following supplementary notes.

(Supplementary note 1) A program for communication being applied to a computer that transfers data using a plurality of lines, the program causing the computer to execute: a splitting process of splitting an inputted frame; a distributing process of distributing split frames based on output bandwidths of the plurality of lines; and a transmitting process of transmitting distributed frames, wherein the distributing process is executed to distribute a frame to a line that has the largest remaining output weight, which indicates the ratio of the remaining amount of data that can be outputted through the line in every predetermined period to the amount of data that can be outputted per unit time, which is specified for each line as the output bandwidth, and wherein the transmitting process is executed to transmit a dummy frame equivalent to the remaining amount of data upon lapse of the predetermined period.

(Supplementary Note 2) The program for communication according to Supplementary Note 1, the program causing a computer to execute: a transmitting process to transmit to another device a control frame that includes the amount of transmission data transmitted from each line; and a distributing process to receive a control frame that has been transmitted by the other device in response to transmission of the control frame, and, if the amount of reception data received by the other device, the amount being included in the control frame, is smaller than the amount of transmission data, make a setting so as to narrow an output bandwidth of a line through which the control frame has been transmitted.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-096762, filed on May 8, 2014, the disclosure of which is incorporated herein in its entirety by reference.

INDUSTRIAL APPLICABILITY

The present invention is suitably applied to a communication device that transfers data by aggregating a plurality of communication lines. Examples of the communication lines may include Ethernet (registered trademark) networks and other lines for carrying out communications using packets or cells.

REFERENCE SIGNS LIST 1, 15 Communication device
2 Receiving unit
3 Transmitting unit
4 Splitting unit
5 Bandwidth managing unit
6 Distributing unit
7 Control frame generating unit
8 Storing unit
9 Arbitrating unit
10 Filtering unit
11 Control frame processing unit
12 Storing unit
13 Reading unit
14 Combining unit

The invention claimed is:

1. A communication device that transfers data using a plurality of lines, the communication device comprising: a splitting unit that splits an inputted frame;
   a distributing unit that distributes split frames based on output bandwidths of the plurality of lines; and
   a transmitting unit that transmits the splitted distributed frames,
   wherein the transmitting unit transmits to another device a control frame that includes an amount of transmission data transmitted from each line,
   wherein the distributing unit distributes a frame to a line that has a largest remaining output weight, which indicates a ratio of a remaining amount of data that can be outputted through the line in every predetermined period to an amount of data that can be outputted per unit time, which is specified for each line as the output bandwidth,
   wherein the distributing unit receives the control frame that has been transmitted by the other device in response to transmission of the control frame, and, if an amount of reception data received by the other device, the amount being included in the control frame, is smaller than the amount of transmission data, the distributing unit makes a setting so as to narrow an output bandwidth of a line through which the control frame has been transmitted and wherein the transmitting unit transmits a dummy frame equivalent to the remaining amount of data upon lapse of the predetermined period.

2. The communication device according to claim 1, wherein the distributing unit determines a specified output bandwidth based on the amount of reception data received by another device relative to an interval between transmissions of the control frame.

3. The communication device according to claim 1, wherein the transmitting unit increases an amount of data of the transmitted dummy frame,
   and wherein, if no delay is caused by the increased dummy frame, the distributing unit makes a setting so as to widen an output bandwidth of a line through which the increased dummy frame has been transmitted, based on the increased amount of data of the dummy frame.

4. The communication device according to claim 3, wherein the transmitting unit increases the amount of the dummy frame to the extent that no frame loss is caused.

5. A communication system comprising a plurality of communication devices, the communication devices each transferring data using a plurality of lines, wherein each of the communication devices comprises: a splitting unit that splits an inputted frame;
   a distributing unit that distributes split frames based on output bandwidths of the plurality of lines; and
   a transmitting unit that transmits the splitted distributed frames, wherein the transmitting unit in a first communication device transmits to a second communication device a control frame that includes ara amount of transmission data transmitted from each line, wherein the transmitting unit in the second communication device transmits to the first communication device the control frame in which the amount of reception data received by a local communication device is set, wherein the distributing unit distributes a frame to a line that has a largest remaining output weight, which indicates a ratio of a remaining amount of data that can be outputted through the line in every predetermined period to an amount of data that can be outputted per unit time, which is specified for each line as the output bandwidth, wherein, if the amount of reception data included in the control frame received from the second communication device is smaller than the amount of transmission data, the distributing unit in the first communication device makes a setting so as to narrow an output bandwidth of a line through which the control frame has been transmitted and wherein the transmitting unit transmits a dummy frame equivalent to the remaining amount of data upon lapse of the predetermined period.

6. A communication method for transferring data using a plurality of lines, the method comprising:

splitting an inputted frame;

transmitting to another device a control frame that includes an amount of transmission data transmitted from each line;

receiving the control frame that has been transmitted by the other device in response to transmission of the control frame;

distributing a split frame to a line that has a largest remaining output weight, which indicates a ratio of a remaining amount of data that can be outputted through the line in every predetermined period to an amount of data that can be outputted per unit time, which is specified for each line as an output bandwidth; and if an amount of reception data received by the other device, the amount being included in the control frame, is smaller than the amount of transmission data, making a setting so as to narrow an output bandwidth of a line through which the control frame has been transmitted; and transmitting the splitted distributed frame and a dummy frame equivalent to the remaining amount of data upon lapse of the predetermined period.

* * * * *

UNITED STATES PATENT AND TRADEMARK OFFICE
CERTIFICATE OF CORRECTION

PATENT NO. : 10,142,247 B2
APPLICATION NO. : 15/309520
DATED : November 27, 2018
INVENTOR(S) : Ikuo Hirata Page 1 of 1

It is certified that error appears in the above-identified patent and that said Letters Patent is hereby corrected as shown below:

In the Claims

Column 19, Claim 5, Line 3, delete "ara" and insert --an-- therefor

Signed and Sealed this
Second Day of April, 2019

Andrei Iancu
*Director of the United States Patent and Trademark Office*